(12) United States Patent
Humpert et al.

(10) Patent No.: US 7,343,593 B2
(45) Date of Patent: Mar. 11, 2008

(54) METHOD AND DEVICE FOR PORTING SOFTWARE PROGRAMS TO A TARGET PLATFORM BY WAY OF AN ELECTRONIC DATA PROCESSING SYSTEM

(75) Inventors: Hans-Dieter Humpert, Hemhofen (DE); Dieter Kleyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 675 days.

(21) Appl. No.: 10/452,228

(22) Filed: Jun. 3, 2003

(65) Prior Publication Data

US 2004/0111712 A1   Jun. 10, 2004

(30) Foreign Application Priority Data

Dec. 9, 2002   (EP) .................................. 02027432

(51) Int. Cl.
*G06F 9/44* (2006.01)
(52) U.S. Cl. ...................................... 717/136; 717/147
(58) Field of Classification Search ................. 717/136
See application file for complete search history.

(56) References Cited

U.S. PATENT DOCUMENTS

| | | | |
|---|---|---|---|
| 5,142,469 A | | 8/1992 | Weisenborn |
| 6,370,682 B1 * | | 4/2002 | Eckardt et al. ............. 717/141 |
| 6,526,570 B1 * | | 2/2003 | Click et al. ................ 717/146 |
| 6,769,115 B1 * | | 7/2004 | Oldman ...................... 717/126 |
| 2004/0205754 A1 * | | 10/2004 | Gazda et al. ............... 718/100 |
| 2005/0114828 A1 * | | 5/2005 | Dietrich et al. ............ 717/101 |

OTHER PUBLICATIONS

"The Realizer—A Case Tool for Real-World Applications", Elektor electronics, Elektor Publishers Ltd., XP000290169, p. 43, Feb. 18, 1992.
Halang W., "Languages and Tools for the Graphical and Textual System Independent Programming of Programmable Logic Controllers", XP000071818, pp. 583-590 Aug 27, 1989.
"Realizer User' s Guide", Actum Solutions, XP002275438 Feb. 18, 1992.

* cited by examiner

*Primary Examiner*—Wei Zhen
*Assistant Examiner*—Phillip H Nguyen
(74) *Attorney, Agent, or Firm*—Harness, Dickey & Pierce, P.L.C.

(57) ABSTRACT

A first functional plan is created from a platform-independent, technological functional plan and a second functional plan, which is adapted to specific requirements of the target platform, is generated from the latter in a subsequent step. Finally, a software program for the target platform is generated essentially automatically, by way of the second functional plan. A corresponding device includes a read-in unit for reading in the first functional plan, and a memory device with a rule base for transferring at least one platform-independent port and/or parameter and/or functional module of the first functional plan into at least one further port and/or further parameter and/or further functional module of the second functional plan. The second functional plan is generated by a processing unit, by way of the rule base and the first functional plan.

11 Claims, 1 Drawing Sheet

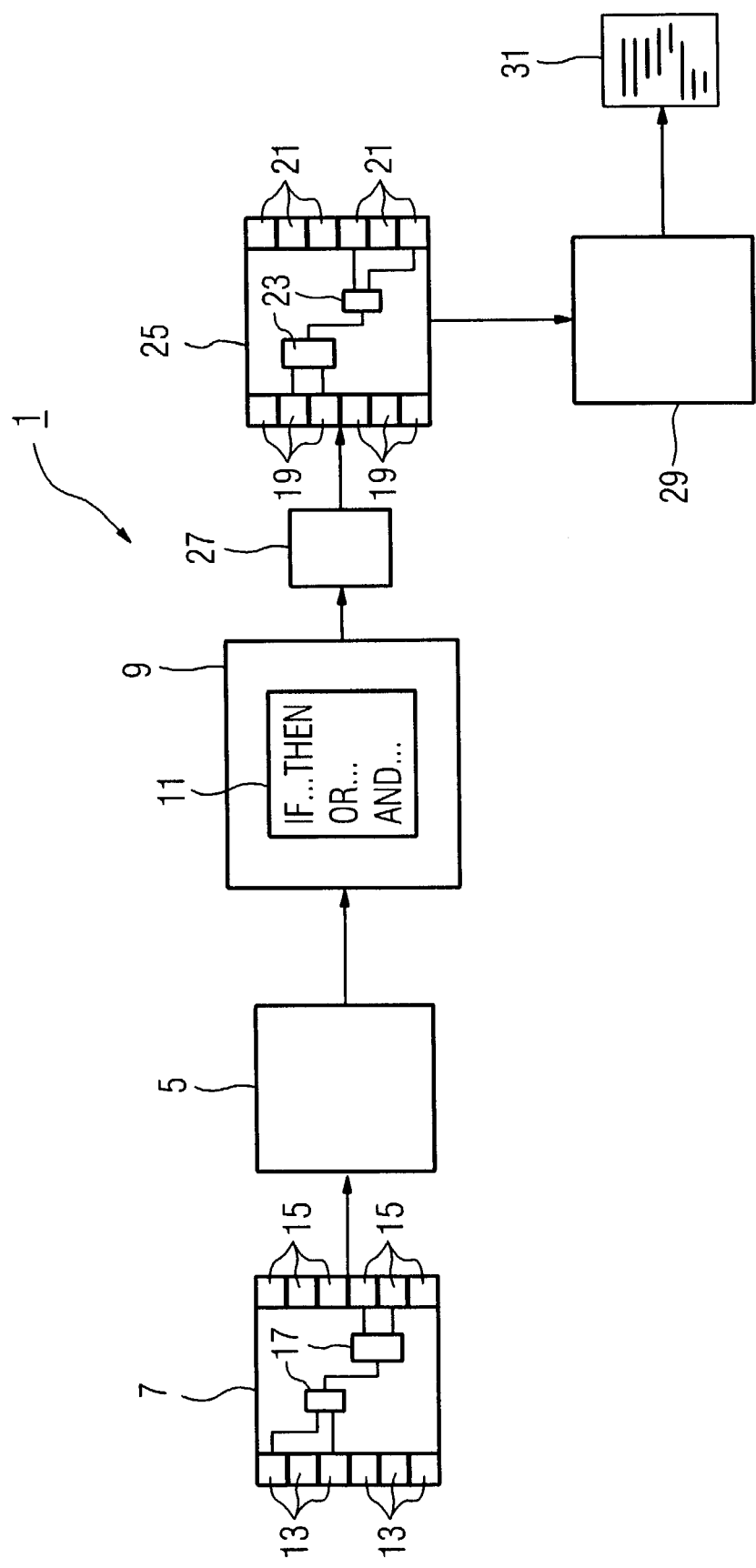

METHOD AND DEVICE FOR PORTING SOFTWARE PROGRAMS TO A TARGET PLATFORM BY WAY OF AN ELECTRONIC DATA PROCESSING SYSTEM

The present application hereby claims priority under 35 U.S.C. §119 on European patent application number EP 02027432.0 filed Dec. 9, 2002, the entire contents of which are hereby incorporated herein by reference.

FIELD OF THE INVENTION

The invention generally relates to an electronic data processing-based method and a device for porting software programs to a target platform.

BACKGROUND OF THE INVENTION

In the course of increasing international competition in virtually all branches of the economy, the degree of automation of technical systems is becoming more and more significant as such automation can have a favorable effect not only on the reliability and quality of a wide variety of process engineering processes, but also on the implementation costs thereof.

This leads to increasingly heavy use of electronic data processing systems whose hardware and software components are subjected to an innovation cycle which is becoming ever shorter. Furthermore, there is a tendency to replace electronic data processing systems which were previously specially designed for specific process engineering functions by standard components, for example personal computers, which are widespread and can be obtained through the relevant specialist retail outlets.

In the course of the modernization of, for example, a process control system of a technical system, there is an increasing problem of porting the software which is installed on the process control system and matched to its special requirements to a modernized electronic data processing system which makes other requirements of the running capability of the software.

Here, there are in particular difficulties if an outdated component which is near to the processes is replaced with a new component which is not compatible with it. The software programs which run on this outdated component generally have to be completely newly created, which requires considerable expenditure.

In order to overcome this problem, it is known to create application programs in what is referred to as a "pseudo-code" which is modeled on the structure of a computer program but does not include the specific hardware and software requirements of a specific target platform. This pseudo-code thus describes in a general form which is close to software in a technical function which is to be processed by a software program, and which may be used as a basis for the creation of corresponding software programs for selected target platforms.

It is disadvantageous here that, owing to the representation of the technical solution to the problem in a way which is near to the software, the overview for the projecting engineer is highly restricted. Furthermore, when such pseudo-codes are ported to a specific target platform, it is usually still necessary to carry out numerous modifications in order to obtain a program code which is capable of running on the target platform. As a result, the degree of re-usability of this pseudo-code is highly restricted.

SUMMARY OF THE INVENTION

An embodiment of the invention is therefore based on an object of specifying an improved method and a device for porting software programs to a target platform by way of an electronic data processing system. Here, the intention is that it will be possible in particular to port solutions to technical problems once they have been conceived to a new target platform with as little modification expenditure as possible.

With respect to the method, an object may be achieved according to an embodiment of the invention by way of a method for porting software programs to a target platform by way of an electronic data processing system having the following steps:
1. A platform-independent, technological functional plan is created as a first functional plan for a function which is to be processed by way of a software program.
2. A second functional plan which is adapted to specific requirements of the target platform is created by way of the first functional plan.
3. The software program for the target platform is generated by way of the second functional plan.

In contrast to the known methods of the pseudo-code which are mentioned above, an embodiment of the invention is based on the graphic representation of a solution to a technical problem which does not include any reference to a specific hardware and/or software platform. This first functional plan includes the technical process parameters, the linking of the signals which arise in the process and the control algorithms which are used.

This first functional plan is a graphic representation of a solution to a technical problem which provides the person skilled in the art with a clear overview and is not based on the structure of a software program (in contrast to a pseudo-code).

It is thus possible, for example, for reasons of quality assurance, of efficient engineering and of economic implementation, to create solutions to technical problems for technical systems in a general form by way of first functional plans which can be re-used virtually without modification in further similar technical systems.

In order to obtain a software program which is capable of running on the target platform, in the second step of the method a second functional plan is created which includes the specific hardware and software requirements of the target platform so that the solution to the technical problem which is formulated by way of the first functional plan can run as a software program on the target platform. For this purpose, the software program is generated by way of the second functional plan in the third step of the method. As the second functional plan includes the specific requirements for the software program to be capable of running on the target platform, the second functional plan—which includes a graphic representation of the solution to the technical problem which relates to the selected target platform and is covered by the first functional plan—can be converted essentially automatically. All that is necessary for this for example is an interpreter which converts the information contained in the second functional plan into software code which can run on the target platform.

As the implemented technology-specific functionality, that is to say the problem solution which is independent of the hardware used, predominates in most technical systems, the degree of re-usability of solutions to technical problems once they have been conceived is particularly high using a method according to the invention. Such technological functions include, for example, the control of pumps, valves, motors or startup and shutdown programs using stepping controllers, or realize regulating functions. This functionality, which constitutes the major part of the automation software in most technical systems, is determined virtually exclusively by the setting of the technological objective. The first functional plans are created, for example, by way of graphic editors, functional modules being placed in a working region, parameterized and connected. The functional modules comprise technological parameters and interfaces/ports which are determined exclusively by the setting of the technological objective here.

On the basis of this first functional plan or the first functional plans, the second functional plan or plans are then generated and adapted to the specific, in particular hardware, requirements of the target platform so that the conversion of the second functional plan into a corresponding software program which is capable of running on the target platform does not cause any difficulties.

It is thus possible to preserve valuable technical knowledge by way of the first functional plan or plans and re-use it for a wide variety of target platforms without time-consuming reworking having to take place every time when porting is carried out.

The first functional plans therefore form a basis for migration for a software program to be ported, the platform-specific functional plan or plans (second functional plans) being generated in a subsequent step. This avoids in particular repeated creation and maintenance of sample templates and standards.

In an advantageous refinement of an embodiment of the invention, at least one platform-independent port and/or parameter and/or functional module of the first functional plan is transferred, in step 2, into at least one further platform-dependent port and/or further parameter and/or further functional module of the second functional plan.

In this step of a method according to an embodiment of the invention, the adaptation of the general, technology-related solution to the specific requirements of the target platform takes place. To do this, general, technology-related interfaces/ports and/or parameters and/or functional modules are converted into the corresponding further elements which include the system-specific, that is to say platform-dependent, functionalities of the target platform. These are, for example, functionalities on the driver level, for example communications functions and functions for accessing the input and output periphery. This may also include any special modules which are present.

It is advantageous here if at least one rule base by way of which the at least one port and/or parameter and/or functional module are transferred into the further port and/or further parameter and/or further functional module is stored in the electronic data processing system.

As the specific requirements of the target platform are defined as framework conditions as soon as the desired target platform is selected, it does not cause any difficulties to transfer general elements defined in the first functional plan into corresponding platform-bound elements. For example, generally defined inputs and/or outputs of the first functional plan can be adapted to the selected target platform at the changeover to the second functional plan by way of the rule-based addition of a concrete read-in and/or read-out address. Furthermore, it is possible, for example, for a functional module of the first functional plan which describes a general PID regulation algorithm, to select the respective platform-specific functional module of the second functional plan. It is thus possible for the regulating algorithm which is supplied with general inputs and outputs in the first functional plan to be ultimately transferred essentially automatically into a corresponding rule algorithm which is capable of running on the target platform and which is then supplied with specifically addressed input values and provides specifically addressed output values. The further functional module of the second functional plan is advantageously assigned here program code which is capable of running on the target platform and is selected from a database or library and is supplied with the aforesaid specifically addressed input values so that the aforesaid specifically addressed output values can be generated by way of the further functional module.

In order to be able to generate corresponding platform-specific further elements of the further functional plans from platform-independent, technological elements with sufficient precision, the elements which are used should be largely harmonized, i.e. the corresponding functional modules as well as ports and parameters should be capable of being mapped on to one another by way of simple rules.

An embodiment of the invention also gives rise to an electronic data processing-based device for porting software programs to a target platform comprising the following components:
- a read-in unit by which a platform-independent technological first functional plan which describes an object which is to be processed by use of a software program can be read into the device,
- a memory device in which a rule base for converting at least one platform-independent port and/or one parameter and/or one functional module of the first functional plan into at least one further port and/or further parameter and/or further functional module of a second functional plan can be stored, and
- a processing unit for generating the second functional plan, the second functional plan being adapted to specific requirements of the target platform.

The rule base advantageously includes here rules by way of which the platform-independent, technological first functional plan can be transformed into the second functional plan.

In a further preferred embodiment, a device according to an embodiment of the invention also includes a coding unit by which the software program for the target platform can be created by way of the second functional plan.

BRIEF DESCRIPTION OF THE DRAWINGS

The FIGURE illustrates an exemplary embodiment in more detail.

The FIGURE shows a device according to an embodiment of the invention.

DETAILED DESCRIPTION OF THE PREFERRED EMBODIMENTS

The device 1 includes a read-in unit 5 to which a first functional plan 7 is fed. This first functional plan describes, in a general form which is decoupled from a specific target platform, a technical objective which is to be processed by a software program 31 on the target platform. The first functional plan 7 may be present here, for example, as a paper printout which is scanned in by the read-in unit 5 or as an electronically readable file.

The device 1 also includes a memory unit 9 with a rule base 11. The latter contains rules for transforming ports 13; 15, parameters and functional modules 17 of the first functional plan 7 into further ports 19; 21, further parameters and further functional modules 23 of a second functional plan 25, the specific requirements for the target platform, that is to say, for example, which specific addresses of the ports 19; 21 of the second functional plan 25 the generally defined ports 13; 15 of the first functional plan 7 are to be mapped to, being taken into account in the rule base 11 so that a software program 31 which constitutes a specific software implementation of the general technical solution, described by the first functional plan 7, can run on the target platform.

Furthermore, a processing unit 27 is provided for generating the second functional plan 25 by way of the rule base II and the first functional plan 7. The second functional plan 25 represents, in a graphic form, the software program 31 which is capable of running on the target platform.

Finally, for converting the second functional plan 25 into the software program 31 which can run on the target platform, an encoding unit 29 by which the elements of the second functional plan 25 are converted into corresponding software components is provided in the figure. For this purpose, the encoding unit 29 can select sections of software code, which correspond for example to the further functional modules 23 and are capable of running on the target platform, from a database or library and combine them in terms of data in accordance with the connection rules contained in the second functional plan 25.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for the portable generating of software programs on a target platform using an electronic data processing system, the method comprising the steps of:
   creating a platform-independent, technological functional plan as a first functional plan for at least one of controlling and regulation tasks, the functional plan to be processed with the aid of a software program;
   creating a second functional plan with the aid of the first functional plan, the second functional plan being adapted to specific requirements of the target platform; and
   generating a software program for the target platform using the second functional plan; wherein
      the first functional plan is provided with functional components that comprise technological parameters, interfaces and connections defined exclusively by a technological problem definition, the first functional plan being further provided with a control base for setting up the second functional plan, and the second functional plan including communication functions of the target platform, and
      the creating the second functional plan further includes,
         converting the technological parameters, interfaces and connections in the first functional plan into corresponding target-platform specific technological parameters, interfaces and connections in the second functional plan; and
         supplementing each of the converted target-platform specific technological parameters, interfaces and connections in the second functional plan with platform-dependent functionalities.

2. An electronic data processing-based device for the portable generating of software programs to a target platform, the electronic data processing-based device comprising:
   a read-in unit configured to read into the device a platform-independent, technological first functional plan the first functional plan describing a control and regulation task to be processed with a software program, and the first functional plan being provided with functional components, which comprise technological parameters, interfaces and connections defined exclusively by a technological problem definition;
   a storage unit configured to store a control base for the conversion of at least one platform-independent port in at least one additional port, the at least one platform-independent port being platform-independent interfaces and at least one of connections, parameters and a functional component of the first functional plan, and the at least one additional port being platform-independent interfaces and at least one of connections, additional parameters and an additional functional component of a second functional plan;
   a processing unit configured to convert the technological parameters, interfaces and connections in the first functional plan into corresponding target-platform specific technological parameters, interfaces and connections in the second functional plan, to generate the second functional plan the second functional plan being generated based on specific requirements of the target platform; wherein
      each of the converted target-platform specific technological parameters, interfaces and connections in the second functional plan are supplemented with platform-dependent functionalities and the second functional plan further includes communication functions of the target platform.

3. The device as claimed in claim 2, wherein the rule base comprises rules, by which the platform-independent, technological first functional plan is adapted to be transformed into the second functional plan.

4. The device as claimed in claim 3, further comprising a coding unit, by which the software program for the target platform is adapted to be created by way of the second functional plan.

5. The device as claimed in claim 2, further comprising a coding unit, by which the software program for the target platform is adapted to be created by way of the second functional plan.

6. A method for the portable generating of software programs on a target platform by means of an electronic data processing-based device system, the method comprising:
   generating a platform-independent, technological functional plan as a first functional plan for at least one of a control and regulating task, the first functional plan to be processed with the aid of a software program;
   generating a second functional plan by means of this first functional plan, the second functional plan being adapted to specific requirements of the target platform; and
   generating the software program for the target platform by means of the second functional plan; wherein
      the second functional plan is generated using a control base,
      the first functional plan includes functional components, the functional components including technological parameters, interfaces and connections defined by a technological problem definition,
      the second functional plan includes communication functions of the target platform, so that the second functional plan includes communications functions as part of the target platform, and the generating of the second functional plan including,
converting the technological parameters, interfaces
and connections in the first functional plan into
corresponding target-platform specific technological parameters, interfaces and connections in the
second functional plan; and
supplementing each of the converted target-platform
specific technological parameters, interfaces and
connections in the second functional plan with
platform-dependent functionalities.

7. An electronic data processing-based device for the portable generating of software programs for a target platform, the device comprising:

a read-in unit through which a platform-independent, technological first functional plan is read into the device, the first functional plan describing a control and regulation task to be processed with a software program, and the first functional plan being provided with functional components, the functional components including technological parameters, interfaces and connections defined by a technological problem definition;

a storage unit for storing a control base for the conversion of at least one platform-independent port in at least one additional port, the at least one platform-independent port including platform-independent interfaces and at least one of connections, a parameter and a functional component of the first functional plan, and the at least one additional port including platform-independent interfaces and at least one of connections, an additional parameter and an additional functional component of a second functional plan; and a processing unit for converting the technological parameters, interfaces and connections in the first functional plan into corresponding target-platform specific technological parameters, interfaces and connections in the second functional plan to generate the second functional plan, the second functional plan being adapted to specific requirements of the target platform; wherein each of the converted target-platform specific technological parameters, interfaces and connections in the second functional plan are supplemented with platform-dependent functionalities and the second functional plan further includes communication functions of the target platform.

8. An electronic data processing-based device for the portable generating of software programs to a target platform, the electronic data processing-based device comprising:

a means for reading into the device a platform-independent, technological first functional plan, the first functional plan describing a control and regulation task to be processed with a software program, and the first functional plan being provided with functional components, which comprise technological parameters, interfaces and connections defined by a technological problem definition;

a means for storing a control base for the conversion of at least one platform-independent port in at least one additional port, the at least one platform-independent port being platform-independent interfaces and at least one of connections, parameters and a functional component of the first functional plan, and the at least one additional port being platform-independent interfaces and at least one of connections, additional parameters and additional functional component of the second functional plan;

a means for converting the technological parameters, interfaces and connections in the first functional plan into corresponding target-platform specific technological parameters, interfaces and connections in the second functional plan to generate the second functional plan, the second functional plan being further generated based on specific requirements of the target platform; wherein each of the converted target-platform specific technological parameters, interfaces and connections in the second functional plan are supplemented with platform-dependent functionalities and the second functional plan further includes communication functions of the target platform.

9. The device as claimed in claim 8, wherein the rule base comprises rules, by which the platform-independent, technological first functional plan is adapted to be transformed into the second functional plan.

10. The device as claimed in claim 9, further comprising coding means for creating the software program for the target platform, by way of the second functional plan.

11. The device as claimed in claim 8, further comprising coding means for creating the software program for the target platform, by way of the second functional plan.

* * * * *